United States Patent [19]
Wolff

[11] Patent Number: 5,789,742
[45] Date of Patent: Aug. 4, 1998

[54] NEAR-FIELD SCANNING OPTICAL MICROSCOPE PROBE EXHIBITING RESONANT PLASMON EXCITATION

[75] Inventor: Peter A. Wolff, Boston, Mass.

[73] Assignee: NEC Research Institute, Inc., Princeton, N.J.

[21] Appl. No.: 739,096

[22] Filed: Oct. 28, 1996

[51] Int. Cl.$^6$ .............................. G02B 6/26; G02B 21/00
[52] U.S. Cl. .................... 250/227.11; 250/234; 250/306; 385/123; 385/12
[58] Field of Search .................................. 250/234, 235, 250/236, 216, 227.11, 306, 307; 385/12, 13, 5, 123

[56] References Cited

U.S. PATENT DOCUMENTS

| | | | |
|---|---|---|---|
| 4,917,462 | 4/1990 | Lewis et al. | 350/319 |
| 5,025,147 | 6/1991 | Dürig et al. | 250/216 |
| 5,272,330 | 12/1993 | Betzig et al. | 250/216 |
| 5,288,999 | 2/1994 | Betzig et al. | 250/227 |
| 5,410,151 | 4/1995 | Buckland | 250/227 |
| 5,485,536 | 1/1996 | Islam | 385/31 |
| 5,633,972 | 5/1997 | Walt et al. | 385/116 |
| 5,664,036 | 9/1997 | Islam | 385/31 |

OTHER PUBLICATIONS

Dietz et al., "Inelastic Electron Scattering By Intra–and Interband Plasmons in Rhenium Trioxide, Tungsten Trioxide, and Some Tungsten Bronzes," *Physical Review B*, vol. 17, No. 10, 15 May 1978, pp. 3790–3800.

G.A. Valaskovic, et al. "Parameter Control, characterization and optimization in the fabrication of optical fiber near–field probes", 1 Mar. 1995, vol. 34,No. 7, Applied Optics, pp. 1215–1227.

P.B. Johnson, et al. "Optical Constants of the Noble Metals", 15 Dec. 1972, Physical Review B, vol. 6, No. 12, pp. 4370–4379.

U.Ch.Fischer, "Submicrometer aperture in a thin metal film as a probe of its microenvironment through enhanced light scattering and fluorescence", vol. 3, No. 10/Oct. 1986/J.Opt. Soc.Am.B., pp. 1239–1244.

R.S. Becker, et al. "Surface plasmon dispersion on a single–sheeted hyperboloid", Can.J.Phys., vol. 59, 1981, pp. 521–529.

D.W. Pohl "Scanning Near–field Optical Microscopy (SNOM)", Advances in Optical and Electron Microscopy vol. 12, pp. 243–312; Dec. 1991.

M. Specht, et al. "Scanning Plasmon Near–Field Microscope", Physical Review Letters, vol. 68, No. 4, 27 Jan. 1992, pp. 476–479.

B. Hecht, et al. "Local Excitation, Scattering, and Interface of Surface Plasmons", Physical Review Letters vol. 77, No. 9, 26 Aug. 1996.

D.W. Pohl, et al. "Optical stethoscopy: Image recording with resolution λ/20", Appl.Phys.Lett. 44(7), 1 Apr. 1984.

*Primary Examiner*—Edward P. Westin
*Assistant Examiner*—John R. Lee
*Attorney, Agent, or Firm*—Philip J. Feig

[57] ABSTRACT

A tapered probe tip for use in near-field scanning optical microscopy is coated with a sheath of metal material having a plasma frequency comparable to optical frequencies. Alternatively, the sheath material has lower energy plasmons. The preferred sheath material is silver. Other preferred sheath materials are potassium, Rb, cesium, tungsten oxide, sodium tungsten oxide and Re oxide.

14 Claims, 2 Drawing Sheets

NEAR-FIELD SCANNING OPTICAL MICROSCOPE PROBE EXHIBITING RESONANT PLASMON EXCITATION

FIELD OF THE INVENTION

The present invention relates to optical microscopes in which a small aperture, typically smaller than an optical wavelength, is positioned within the optical near field of a specimen to be examined and the aperture is scanned over the surface of the specimen to produce a time-varying optical signal to produce an image having very high resolution. Specifically, the aperture is a tapered optical fiber coated with a material selected based on its optical wavelength and particularly the evanescent wave attenuation of the optical radiation passing through the aperture in order to greatly reduce the attenuation of the optical power. Quite specifically, the tapered aperture is preferably coated with silver, although metals selected from the group consisting of potassium, rubidium, and cesium could also be used as well as metallic compounds such as $WO_3$, $Na_xWO_3$ and $ReO_3$.

BACKGROUND OF THE INVENTION

Microscopes employing conventional optical imaging systems cannot resolve features substantially smaller than about one-half an optical wavelength. Thus, when the aperture of the microscope objective and its distance from the specimen are substantially larger than a wavelength, diffraction effects limit the smallest resolvable separation between a pair of points to 0.5 $\lambda$/NA, where $\lambda$ is the optical wavelength and NA is the numerical aperture of the objective lens, which typically is limited to a value of 1.6 or less.

Electron microscopy has been successful in resolving features much smaller than those resolvable with conventional optical microscopy. However, electron microscopy has its own limitations such as, the requirement of the specimen being enclosed in an evacuated chamber.

Near-field optical microscopy (NSOM) has been used to circumvent the limitation of conventional optical imagery systems. In NSOM, an aperture having a diameter smaller than an optical wavelength is disposed in close proximity to the specimen surface and scanned over the surface. The specimen is reflectively or transmissively illuminated from an external source. A portion of the reflected or transmitted light is collected by the aperture and relayed to a photodetector by, for example, an optical fiber. Alternatively, light is relayed by an optical fiber to the aperture, which itself acts as a light source for reflective or transmissive illumination of the specimen. Conventional means are then used to collect and detect the reflected or transmitted light. In either case, the detected optical signal is reconstructed to provide image information.

In a recent approach to near-field scanning optical microscopy the light is transmitted through an optical fiber. The end of the fiber opposite the specimen is drawn down to produce a small diameter (order of 50 nm) centrally disposed aperture.

A limitation to these approaches is that the light is transmitted through the fiber with a very low efficiency. As a result, the signal levels are very low. If the aperture is enlarged to permit more light to pass, the resolution is reduced, obviating any advantage of using near-field scanning optical microscopy instead of conventional optical microscopy.

In order to maintain the transmission efficiency without unduly reducing the resolution, R. E. Betzig et al in U.S. Pat. No. 5,272,330 and in U.S. Pat. No. 5,288,999 suggest coating the drawn optical fiber with a metal cladding to confine the light in the fiber. With such an arrangement resolutions below 50 nm are achieved, but at a cost. As the light approaches the aperture, the light must propagate in a severely attenuated evanescent since the small diameter metal-clad waveguide the light is then in is well below cutoff. Betzig, et al. predict and measure energy transmission efficiencies on the order of $10^{-6}$. The present invention substantially improves these efficiencies. Similar problems are encountered when light is reflected from the specimen through the tip in the opposite direction. Betzig et al attempt to overcome these problems by applying a metal coating to the tip.

Another near-field scanning optical microscopy tapered metal-coated aperture probe is disclosed by A. Lewis et al in U.S. Pat. No. 4,917,462. This patent describes the use of an aluminum coating incorporated onto the outer surface of a pipette to increase the capacity of the glass wall.

M. N. Islam in U.S. Pat. No. 5,485,536 discloses a tapered fiber optic probe for near-field optical microscopy having an outer cladding. The preferred cladding is also aluminum.

L. Buchland in U.S. Pat. No. 5,410,151 also teaches the use of a metal coated tapered fiber optic probe for use in near-field scanning optical microscopy.

In practice, additional enhancement is required to make NSOM a practical tool for use in such applications as lithography, data storage, and large scale biological applications where the NSOM's excellent resolution would be advantageous.

The prior art devices attenuate the light energy on the order of amplitude of $10^{-6}$. In order to overcome this limitation, the present invention refers to a tapered probe construction, where by selecting appropriate sheath metals and suitably chosen optical wavelengths, NSOM powers can be enhanced by several orders of magnitude making NSOM a much more useful device.

SUMMARY OF THE INVENTION

The present invention overcomes the limitations of the prior art by providing a NSOM probe construction which includes sheath material which minimizes evanescent wave attenuation for the reasons set forth below.

A preferred coating material is silver. Other preferred coating metals are potassium, rubidium, cesium, tungsten oxide, sodium tungsten oxide and rhenium oxide. The reasons for selecting these materials in general, and preferably silver in particular, will become more clearly apparent from the following description.

A principal object of the present invention is therefore, the provision of a near-field scanning optical microscope including a probe having a tapered aperture probe tip of a material having a plasma frequency comparable to the frequency of the light traveling through the tip.

Another object of the present invention is the provision of a near-field scanning optical microscope including a probe having a tapered aperture probe tip of a material having low energy plasmons.

A further object of the present invention is the provision of a near-field scanning optical microscope including a probe having a tapered aperture probe tip having a sheath selected from silver, potassium, rubidium, cesium, tungsten oxide, sodium tungsten oxide and rhenium oxide.

Further and still other objects of the invention will become more clearly apparent when the following description is read in conjunction with the accompanying drawing.

DETAILED DESCRIPTION OF THE INVENTION

Figure 1:
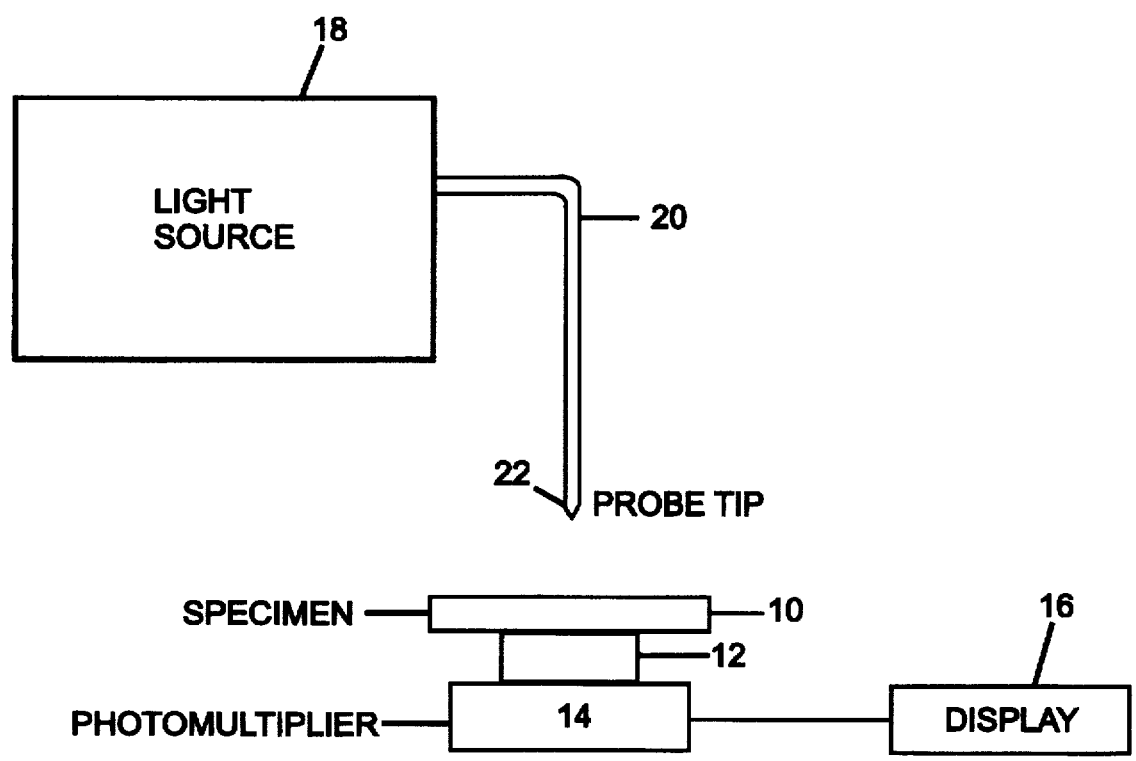
FIG. 1 is a schematic illustration of a near-field scanning optical microscope (NSOM)

Referring now to the figures and to FIG. 1 in particular, there is shown schematically a diagram of a typical near-field scanning optical microscope. A specimen 10 to be examined is placed upon a carrier or support 12 which, in turn, is optically and mechanically coupled to a photomultiplier 14 or equivalent device for converting light transmitted through the specimen to a display 16 for viewing. Light is transmitted to the specimen from a light source 18 through an optical fiber 20 via a tapered aperture probe tip 22 to the specimen 10. After passing through the specimen 10, the light is received by carrier 12 (which may comprise a lens) and photomultiplier 14 for processing and ultimate viewing on display 16.

The described and illustrated apparatus is a through transmission NSOM. In the case of a reflecting NSOM, light is reflected from the specimen 10 to a collimator or equivalent device for transmission to a photomultiplier 14 for being displayed by a display 16.

Figure 2:
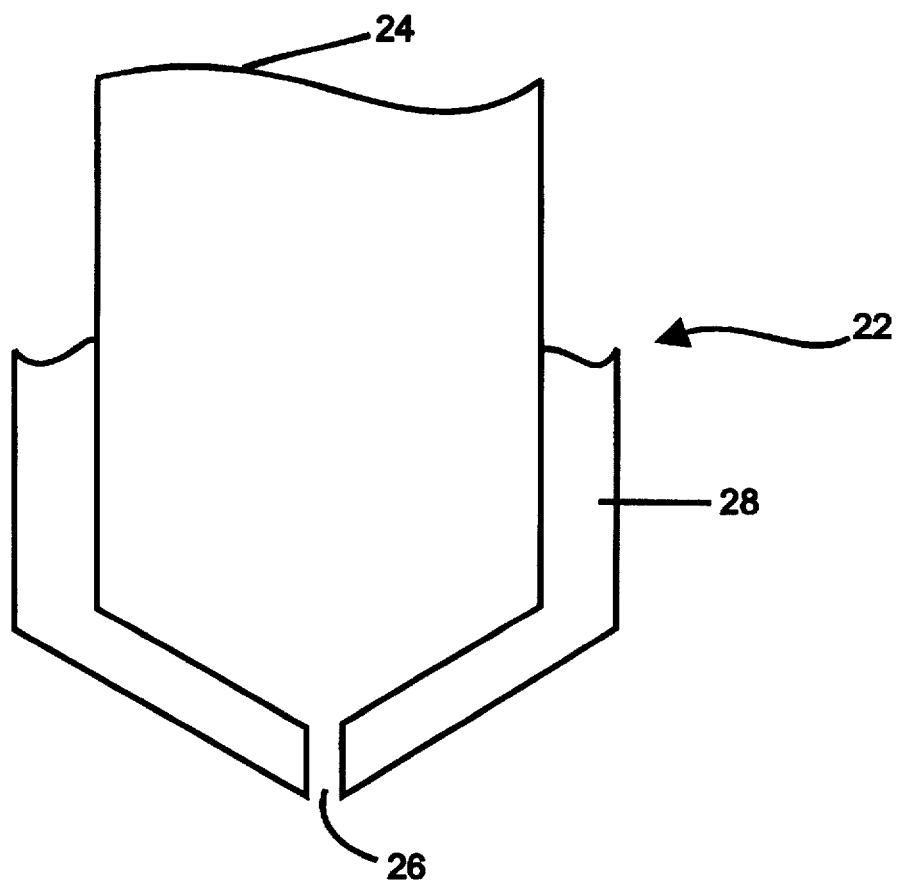
FIG. 2 is a schematic representation of the probe tip forming a portion of the NSOM shown in FIG. 1.

FIG. 2 is a schematic representation of the probe tip 22. The probe tip 22 is fabricated in any conventional manner such as is described in the patents to Betzig et al and Lewis et al. The tip 22 comprises basically a tapered optical fiber 24 having an aperture 26 and a cladding or sheath 28. The dimensions of the fiber, aperture and sheath are known to those skilled in the art. The present invention resides in the selection of the sheath material 28 as will now be described.

In a typical tapered, aluminum-clad pulled-glass-fiber tip the cutoff diameter for 5400 A radiation in a TE mode is approximately 2000 A, where for high resolution microscopy the light must reach a tip aperture having a diameter in the order of 500 A. In order to accomplish this, the light tunnels or travels through the fiber as an evanescent wave with exponential decay from the cutoff diameter to the substantially smaller aperture, a distance of approximately 5000 A. Betzig et al show that the optical power is attenuated by a factor of approximately $10^{-6}$ and experiments confirm this value. The conclusion to be made is that evanescent wave attenuation is the main cause of the poor NSOM, otherwise the Betzig et al tips would be nearly ideal. Less ideal tips can exhibit efficiencies as low as $10^{-8}$. See, Valaskovic et al, Applied Optics, 34, 1215 (1995).

The prior art does not teach, suggest or consider the wavelength dependence of the evanescent decay which is very strongly correlated. From the Betzig et al formula the estimated decay at the 3250 A line of the He—Cd laser, for example, would be less than $10^3$. The attenuation is at the shorter wavelengths because the distance from the cutoff point (now 1200 A) is smaller and because decay constants are smaller. One conclusion of this finding is that improvement of NSOM efficiency should focus on using wavelengths in the near UV. Presently, however, high quality, UV optical fibers are not available.

Previously relied upon calculations of evanescent wave attenuation assume infinite conductivity in the metal coatings of the probe tips and disregard any plasma affects. These approximations are reasonable for conventional aluminum clad fibers since the plasma frequency of aluminum ($\hbar\omega_p \approx 16$ eV) is outside of the optical range.

However, other metals—notably silver—have plasma frequencies near the visible spectrum.

The plasma frequency of silver is $\hbar\omega_p=3.78$ eV and the important internal surface plasmon mode of a silver cylinder is at $\hbar\omega_p/\sqrt{2}\approx 2.70$ eV. Light of such energies should strongly couple to surface plasmons in the metal sheath of Ag-coated NSOM tips.

I have extended the theory of metallic waveguides (J. P. Stratton, Electro Magnetic Theory, p. 537) to the case of a metal whose dielectric properties are described by a lossless plasma function:

$$\epsilon(\omega) = \epsilon_0(1 - \omega_p^2/\omega^2)$$

where $\epsilon_0$ is background dielectric constant, $\omega_p$ is the plasma frequency, and $\omega$ is the optical frequency. See, an article by P. B. Johnson, et al. entitled "Optical Constants of the Noble Metal" in Physical Review B, Volume 6, No. 12, 15 Dec. 1972, pp.4370–4379.

Since silver has an exceedingly sharp plasma resonance ($\Delta E_{1/2} \approx 0.075$ eV), neglecting the imaginary part of $\epsilon(\omega)$ is a good approximation. In solving the equation, in the frequency range of interest ($\hbar\omega \approx \hbar\omega_p/\sqrt{2}$) light propagates as a hybrid optic-surface plasmon mode whose field decays exponentially into the metal cladding. This penetration is appreciable in silver coated waveguides because at the surface plasmon resonance the dielectric function is only $\epsilon_0 \approx -2$. By contrast, in conventional aluminum control tips $\epsilon(\omega)$ is large at optical frequencies, so the optical field barely penetrates the metal.

The penetration of light into the silver when $\omega \approx \omega_p/\sqrt{2}$ relaxes the usual TE mode condition $$J_1'(ha)=0$$

for determining the transverse wavevector (h) and substantially reduces the cutoff diameter specifically. For $\omega=0.6\,\omega_p$ (slightly below the surface plasmon at $\omega_p/\sqrt{2} \approx 0.7\,\omega_p$) the cutoff diameter is reduced to 700 A.

The finding of these results implies that a conventional tapered fiber tip, coated with silver, could obviate evanescent wave attenuation to an aperture diameter of 700 A. The surface plasmon component of the wave will undoubtedly cause loss, but this effect could well be less unfavorable than the almost total reflection that cutoff implies.

The prior art also teaches a NSOM probe tip face geometry having a diameter equal to the cutoff diameter (2000 A at 5400 A), with a much smaller aperture defined by annular metallization of one tip face. In theory, light can propagate without attenuation to the tip face. The NSOM efficiency is limited by the ability of the light to squeeze through the small exit aperture.

In practice, there are localized plasmon modes at a metallic aperture and the incoming optic wave is more complicated than a plane wave. The result is that an approximate solution to the NSOM electromagnetic problem is extremely difficult. Nevertheless, resonant excitation of the localized mode ($\omega \approx \omega_{local}$) would enhance the local scattering of light through the aperture. The mechanism is the same as that responsible for surface enhanced Raman scattering, i.e. resonant excitation of localized plasmon modes on nonplanar silver surface. This analogy suggests enhancement factors on the order of $Q^2$, where Q=50 is the quality factor of the silver plasma resonance.

In summary, photon-plasmon coupling in structures whose plasma frequencies are comparable to optical frequencies can substantially improve NSOM. This result was unexpected and not primarily considered by those skilled in the art.

Elemental metals whose plasma frequencies approach the optical frequencies include: Ag ($\hbar\omega_p=3.78$ eV), K ($\hbar\omega_p=3.72$ eV), Rb ($\hbar\omega_p=3.41$ eV) and Cs ($\hbar\omega_p=2.9$ eV).

Among the metals listed above, Ag is preferred because of its chemical stability and the sharpness of its plasma resonance.

Metallic compounds with relatively sharp lower energy ($\approx 2$ eV) plasmons include $WO_3$, $Na_xWO_3$, and $ReO_3$. When using these materials the frequency can be controlled with doping as described in an article by R. E. Dietz et al, Physical Review, vol. B17, 3790 (1978).

NSOM can be greatly improved and light attenuation in NSOM probe tips can be greatly reduced by coating the probe tip with a material having a plasma frequency approaching the optical frequencies or with material having lower energy plasmons.

While there has been described and illustrated preferred embodiments of a NSOM probe tip, it will be apparent to those skilled in the art that variations and modifications are possible without deviating from the broad principles and spirit of the invention which shall be limited solely by the scope of the claims appended hereto.

What is claimed is:

1. A probe for use in a near-field scanning optical microscope comprising:

an optical waveguide having a core and a sheath for coupling light at an optical frequency from a light source to a specimen to be examined;

said waveguide having a taper region terminating in an aperture having a dimension smaller than the wavelength of the light traveling therethrough; and said sheath material having a plasma frequency comparable to the frequency of the light traveling through said waveguide.

2. A probe as set forth in claim 1, where said plasma frequency is substantially in the range between approximately 2.9 eV and 3.8 eV.

3. A probe as set forth in claim 1, where said sheath material is selected from the group consisting of potassium, rubidium and cesium.

4. A probe as set forth in claim 1, where said sheath material is silver.

5. A probe for use in a near-field scanning optical microscope comprising:

an optical waveguide having a core and a sheath for coupling light at an optical frequency from a light source to a specimen to be examined;

said waveguide having a taper region terminating in an aperture having a dimension smaller than the wavelength of the light traveling therethrough; and said sheath material having low energy plasmons.

6. A probe as set forth in claim 5, where said low energy plasmon is below approximately 2 eV.

7. A probe as set forth in claim 5, where said sheath material is selected from the group consisting of $WO_3$, $Na_xWO_3$ and $ReO_3$.

8. A near-field scanning optical microscope including a light source, a waveguide for coupling light at an optical frequency from the light source to a specimen to be examined, the waveguide terminating with a probe, means for causing relative scanning motion between the probe and the specimen, photomultiplier means disposed for receiving light from the specimen and display means coupled to the photomultiplier means for displaying images of the specimens, wherein said probe comprises:

an optical waveguide having a core and a sheath for coupling light at an optical frequency from a light source to a specimen to be examined;

said waveguide having a taper region terminating in an aperture having a dimension smaller than the wavelength of the light traveling therethrough; and said sheath material having a plasma frequency comparable to the frequency of the light traveling through said waveguide.

9. A near-field scanning optical microscope as set forth in claim 8, where said plasma frequency is substantially in the range between approximately 2.9 eV and 3.8 eV.

10. A near-field scanning optical microscope as set forth in claim 8, where said sheath material is selected from the group consisting of potassium, rubidium, and cesium.

11. A near-field scanning optical microscope as set forth in claim 8, where said sheath material is silver.

12. A near-field scanning optical microscope including a light source, a waveguide for coupling light at an optical frequency from the light source to a specimen to be examined, the waveguide terminating with a probe, means for causing relative scanning motion between the probe and the specimen, photomultiplier means disposed for receiving light from the specimen and display means coupled to the photmultiplier means for displaying images of the specimen, wherein said probe comprises:

an optical waveguide having a core and a sheath for coupling light at an optical frequency from a light source to a specimen to be examined;

said waveguide having a taper region terminating in an aperture having a dimension smaller than the wavelength of the light traveling therethrough; and said sheath material having low energy plasmons.

13. A near-field scanning optical microscope as set forth in claim 12, where said low energy plasmon is below approximately 2 eV.

14. A near-field scanning optical microscope as set forth in claim 12, where said sheath material is selected from the group consisting of $WO_3$, $Na_xWO_3$ and $ReO_3$.

* * * * *